Jan. 20, 1931.  L. S. QUINAN  1,789,563
COMBINATION BEAN CULTIVATOR AND CUTTER
Filed Nov. 16, 1929  2 Sheets-Sheet 1

INVENTOR
L. S. Quinan
BY
ATTORNEY

Jan. 20, 1931.  L. S. QUINAN  1,789,563
COMBINATION BEAN CULTIVATOR AND CUTTER
Filed Nov. 16, 1929  2 Sheets-Sheet 2
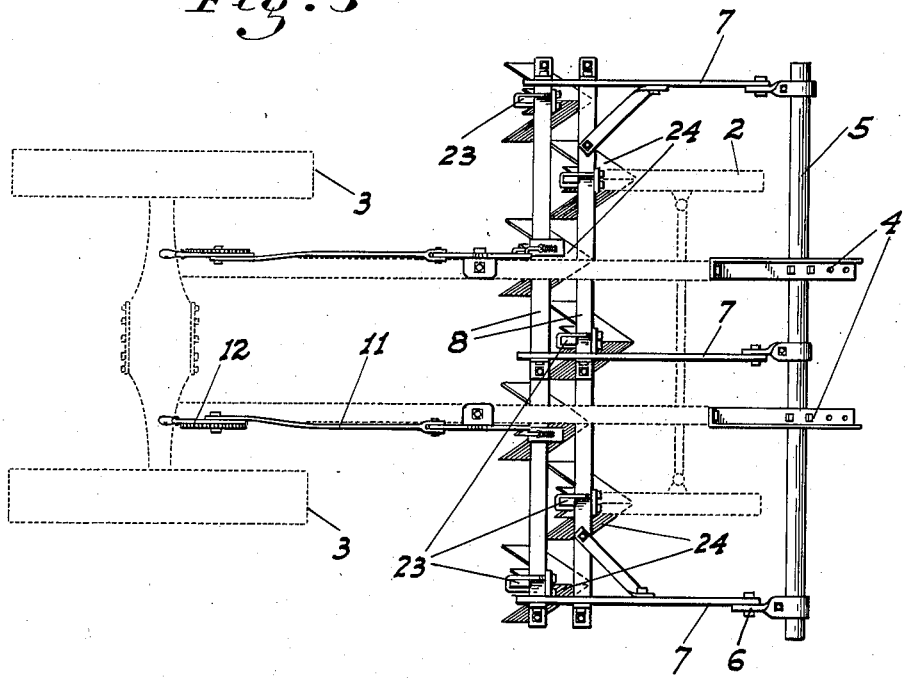
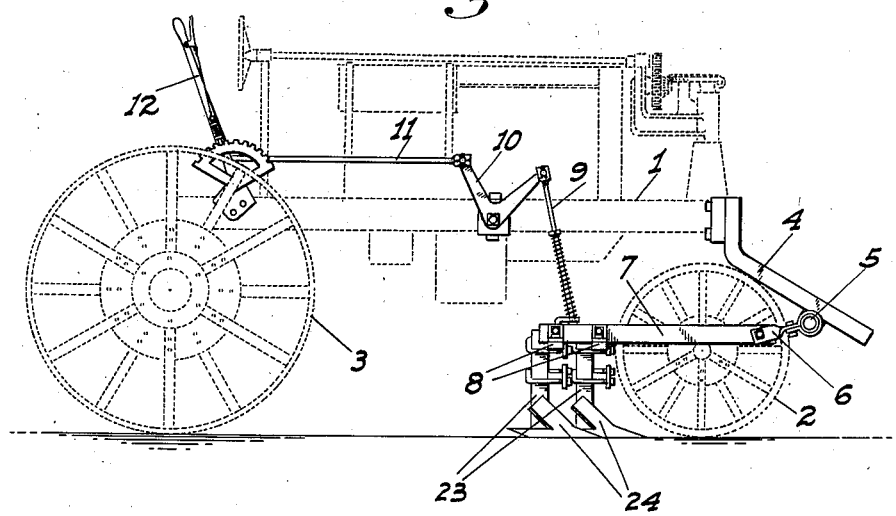
INVENTOR
L. S. Quinan
BY
ATTORNEY Patented Jan. 20, 1931

1,789,563

UNITED STATES PATENT OFFICE

LOUIE S. QUINAN, OF SACRAMENTO, CALIFORNIA

COMBINATION BEAN CULTIVATOR AND CUTTER

Application filed November 16, 1929. Serial No. 407,629.

This invention relates to agricultural implements and particularly to a machine for cultivating and afterwards cutting bean vines.

The principal object of my invention is to provide an apparatus of this general character particularly arranged and designed to be attached to a tractor of a certain standard make and which is so constructed that one main supporting structure serves as a mounting means for both the cultivating and cutting equipment; and the change from one form of equipment to the other is easily and quickly made whenever necessary.

My improved machine or attachment is also arranged so as to be under the control of the operator of the tractor to which it is attached, and with this equipment and the services of one man only approximately 200 acres per day may be cultivated or the crop thereon harvested. Field tests with this machine, which is actually in service, have shown conclusively that in cultivating operations it will replace four teams and three men; and in harvesting operations it will replace five teams and four men. Further, superior work is done and practically none of the beans are threshed out during the harvesting or cutting operations. At the present rate of labor therefore the use of my machine represents a saving of at least $35.00 a day in labor to the owner, apart from the saving entailed by the superior condition of the crop when cut.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 3 is a top plan view of the apparatus as equipped for cultivating purposes.

Fig. 4 is a side elevation of the same.

Figure 1:
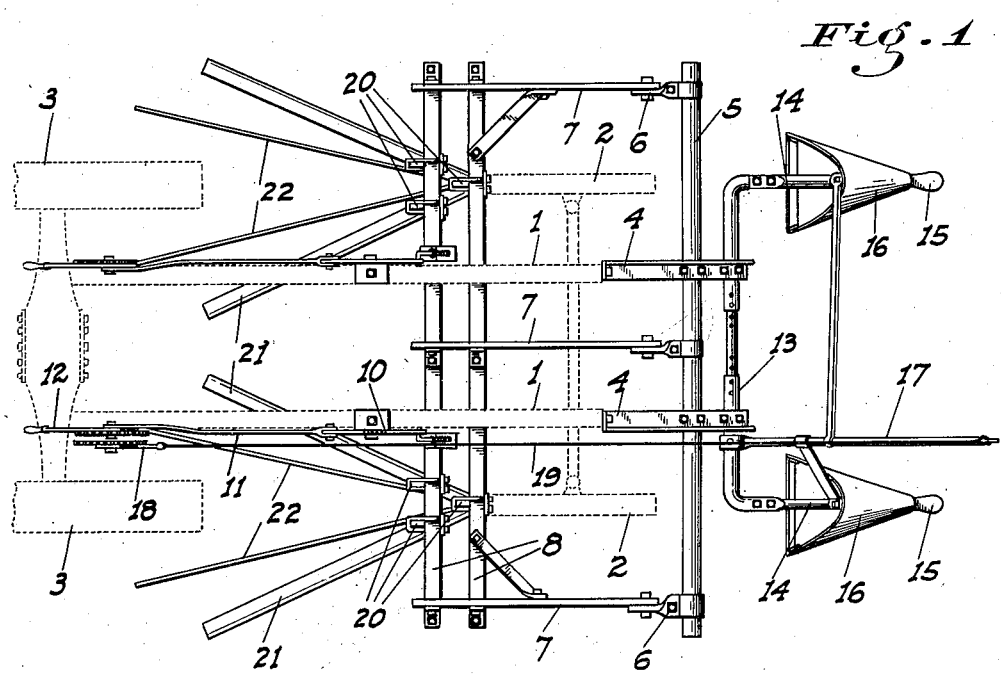
Fig. 1 is a top plan view of the apparatus as arranged in connection with the tractor and as equipped for harvesting.
Figure 2:
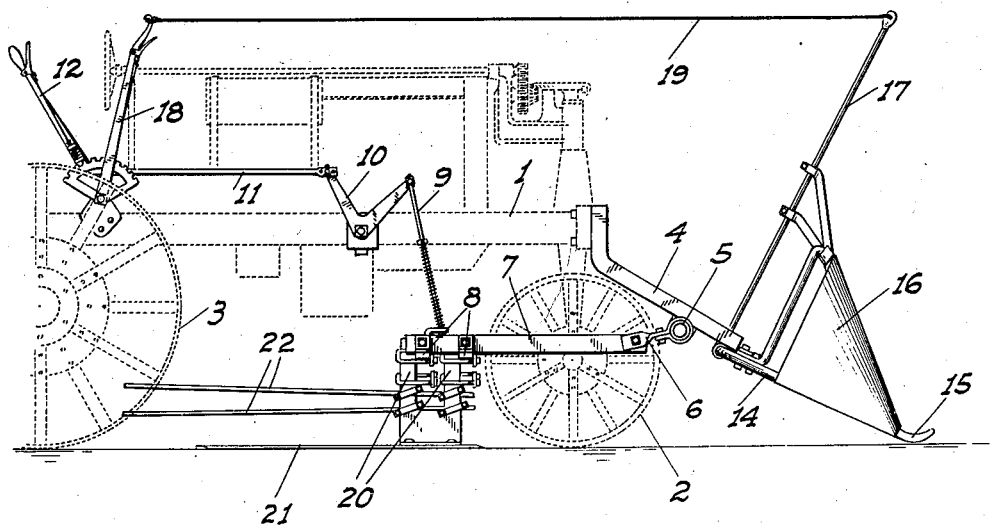
Fig. 2 is a side elevation of the same.

Referring now more particularly to the characters of reference on the drawings, the tractor to which the machine is particularly designed to be attached is preferably the same as that shown in my copending application for patent, Serial No. 394,532, filed September 23, 1929, on account of its having a very high ground clearance; and when equipped with the special front wheel mounting featured in said application, so that the tread of the front and rear wheels will be the same. The chassis of this tractor consists essentially of the main side frames 1, front wheels 2 and rear wheels 3.

The main frame or equipment supporting structure of my attachment, which is the same for either the cultivating or harvesting equipment, comprises a pair of brackets 4 secured to and projecting forwardly and downwardly from the front end of the frames 1. Toward their forward ends the brackets support a transverse beam 5, which is preferably of tubular form for the sake of lightness and which extends in front of the front wheels and some distance beyond the same laterally. Secured to and extending rearwardly from said beam adjacent its ends and at the middle are relatively short arms 6 to which are pivoted rearwardly extending and substantially horizontal bars 7. A pair of longitudinally spaced transverse bars 8 are supported by and extend between the bars toward their rear ends. Upstanding links 9 are connected to the rearmost bar 8 and extend upwardly to connections with bellcranks 10 mounted on the side frames 1. From these bellcranks rods 11 extend to operating levers 12 mounted on the tractor in positions convenient to the operator of the same from his normal station thereon.

The structure thus far described is not disturbed whether cultivating or harvesting operations are to be carried out, as will be evident from a comparison of the different figures on the drawings.

For harvesting operations a tubular member 13 having forwardly projecting arms 14 at its ends is turnably supported from the brackets 4 ahead of the beam 5. These arms are longitudinally alined with the front wheels 2 (which are spaced apart a distance equal to the standard spacing between four rows of vines) and depend to the ground at a forward angle, terminating in transversely flat ground bearing shoes 15. Wedge-like hollow spreaders 16 are secured to and project upwardly and laterally from the arms in diverging relation to the forward ends of the same to separate the vines of the two rows between which each arm is passing, and cause said vines to be disentangled and thrown away from the path of the advancing wheels. An upstanding lever 17 is connected to the member 13, said lever being in turn connected to the operating lever 18, which is disposed toward the rear end of the tractor or adjacent the levers 12, by a suitable connection 19 which extends over the top of the tractor. By means of this lever, therefore, it will be evident that the setting of the arms and spreaders relative to the ground may be altered at will.

Removably strapped to and depending from the bars 8, which are rearwardly of the wheels 2, are standards 20, there being a set of such standards on each side of the tractor substantially in longitudinal alinement with said front wheels. A pair of horizontal cutter blades 21 is secured to the lower ends of each set of standards, said blades diverging in symmetrical relation with respect to the longitudinal plane of the front wheels. Finger rods 22 are strapped to said standards above the blades, said rods also diverging relative to each other so as to prevent the vines as cut from falling into the path of the rear wheels 3 which follow immediately behind the blades.

As a result of this arrangement the tractor may be advanced without the danger of the wheels crushing the vines, since said vines are spread apart clear of the front wheels before being cut and are at the same time thrown into the path of the cutter blades; and the vines as cut are thrown outwardly and away from the rear wheels by the fingers 22. The vines of adjacent rows when cut are therefore arranged together in a single compact windrow, making it a very easy matter to subsequently gather the vines for threshing the beans. The vertical positioning of the cutter blades may of course be adjusted at any time to suit different conditions by suitable manipulation of the levers 12.

When desiring to use the attachment for cultivating purposes the member 13 and its connected parts are removed, and the standards 20 and the parts supported thereby are also removed. In place of said standards other standards 23 are strapped to and depend from the bars 8; said bars carrying suitable cultivator blades 24 on their lower ends.

As is usual in cultivating devices the blades and their standards are arranged in staggered order, as shown in Fig. 3, so that all the ground traversed by the attachment will be properly cultivated. Here again it will be obvious that cultivating operations are under the control of the one man operating the tractor and may be carried out in a very quick and efficient manner.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A tractor attachment for supporting bean-vine or cutting equipment including a transverse beam, brackets for supporting said beam from the frame of the tractor, longitudinally extending bars projecting rearwardly from and pivotally connected to said beam, means operable from the tractor for raising and lowering said bars, transverse bars connected to and extending between said longitudinal bars toward their rear ends, and tool-supporting standards removably secured to and depending from said transverse bars.

2. An attachment for a wheeled tractor for supporting bean-vine cultivating or cutting equipment including a transverse beam disposed ahead of the front wheels of the tractor and extending laterally beyond the same, brackets for supporting the beam from the frame of the tractor, longitudinally extending bars projecting rearwardly from the beam outwardly of said wheels and pivotally connected to said beam, means operable from the tractor for raising or lowering said bars, a transverse bar connected to and extending between said longitudinal bars rearwardly of said wheels, and tool-supporting standards depending from and strapped to said transverse bar.

3. A bean-vine cutting device including longitudinally movable supporting means, cutter blades supported by said means, an arm depending toward the ground ahead of said cutters in transverse symmetrical alinement therewith and mounted in connection with said supporting means, and a vine spreading hood mounted on said arm and extending upwardly to a level above that of the cutters; said hood diverging both upwardly and laterally from adjacent the forward end thereof.

4. A bean-vine cutting device including longitudinally movable supporting means, cutter blades diverging from the plane of movement of and supported by said means, vine spreading means mounted ahead of the cutters in longitudinal alinement with the apex of divergence of the cutters, means for raising and lowering the cutters, and independent means for raising and lowering the spreader at will and without halting the longitudinal movement of the device.

5. A bean-vine cutting attachment for a tractor including a transverse beam disposed ahead of the front wheels of the tractor and extending laterally beyond the same, brackets for supporting the beam from the frame of the tractor, longitudinally extending bars projecting rearwardly from the beam outwardly of said wheels and pivotally connected to said beam, means operable from the tractor for raising or lowering said bars, a transverse bar connected to and extending between said longitudinal bars rearwardly of said wheels, pairs of diverging cutter blades supported from said transverse bars, vine spreading elements to cooperate with the pairs of blades, and means supporting said spreaders from the brackets ahead of the transverse beam.

6. A structure as in claim 4 with a ground bearing wheel mounted in connection with the supporting means and depending between the spreader and cutters in longitudinal alinement with the spreader supporting arms.

7. A bean vine cutting device comprising longitudinally movable supporting means, said means including forwardly projecting brackets, a cutter supporting standard mounted in connection with said supporting means rearwardly of the brackets, a forwardly projecting arm pivoted at its rear end in connection with said brackets, a spreader element mounted on said arm, and means applied to said arm for turning the same about its pivotal connection with the bracket.

8. A bean vine cutting device comprising longitudinally movable supporting means, said means including forwardly projecting brackets, a cutter supporting standard mounted in connection with said supporting means rearwardly of the brackets, a forwardly projecting arm pivoted at its rear end in connection with said brackets, a spreader element mounted on said arm, a lever secured to and projecting upwardly from the arm laterally of its pivotal connection, and an operating element for the lever extending rearwardly from the upper end of the same.

In testimony whereof I affix my signature.

LOUIE S. QUINAN.